Sept. 25, 1956  W. F. DOUBLE  2,764,212
TIRE TRACK WITH DRIVING POINTS
Filed Jan. 9, 1953  2 Sheets-Sheet 1
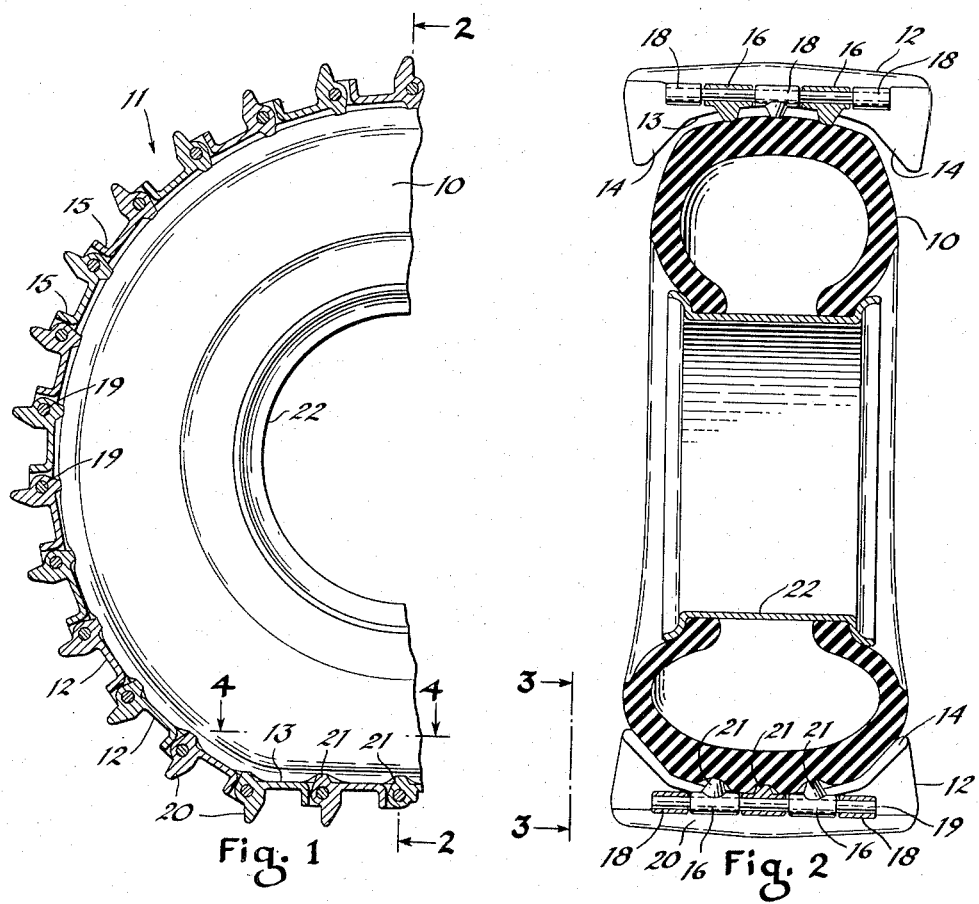
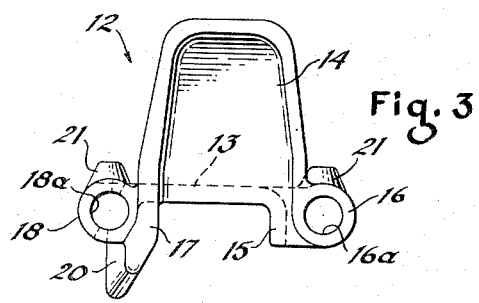
INVENTOR.
Walter F. Double
BY
Hyde, Meyer, Baldwin & Doran
ATTORNEYS Sept. 25, 1956  W. F. DOUBLE  2,764,212
TIRE TRACK WITH DRIVING POINTS
Filed Jan. 9, 1953  2 Sheets-Sheet 2

INVENTOR.
Walter F. Double
BY
Hyde, Meyer, Baldwin & Doran
ATTORNEYS

United States Patent Office 2,764,212
Patented Sept. 25, 1956

2,764,212

TIRE TRACK WITH DRIVING POINTS

Walter F. Double, Wickliffe, Ohio, assignor, by mesne assignments, to General Motors Corporation, Detroit, Mich., a corporation of Delaware Application January 9, 1953, Serial No. 330,462

2 Claims. (Cl. 152—182)

This invention relates to improvements in a combination of a large pneumatic tire and an endless track completely surrounding and partially embracing the tire, said track comprising a plurality of rigid shoes with articulating connections between adjacent shoes.

One of the objects of the present invention is to provide a novel combination between a large size pneumatic tire and an endless track comprising a plurality of rigid shoes having tire engaging faces on which are provided upstanding lugs or points adapted to embed themselves easily in the tread portion of the tire. These lugs or points perform a double function. In the first place, they provide a driving engagement between the tire and the track at the ground-engaging portion thereof so that a driving force applied to the tire through the wheel is transmitted to the track which in turn drivingly engages the ground. In the second place, these lugs also provide some track tightening effect to offset the track loosening caused by the tire flattening on the ground under load.

Another object of the present invention is to provide an improved shoe of the type described for use in an endless track for the purpose disclosed.

Other objects and advantages of my invention will be apparent from the accompanying drawings and description and the essential features thereof will be set forth in the appended claims.

In the drawings,

Fig. 1 is a fragmental side elevational view showing a pneumatic tire with my improved endless track in position on the tire, the entire combination being under load, and the track being broken away in central section to more clearly show the construction;

Fig. 2 is a transverse sectional view of the same taken along the line 2—2 of Fig. 1;

Fig. 3 is an end elevation enlarged of a single shoe taken from the position of the line 3—3 of Fig. 2;

Fig. 4 is a top plan view enlarged of a portion of the track taken from approximately the position of the line 4—4 of Fig. 1; while

Figure 4:
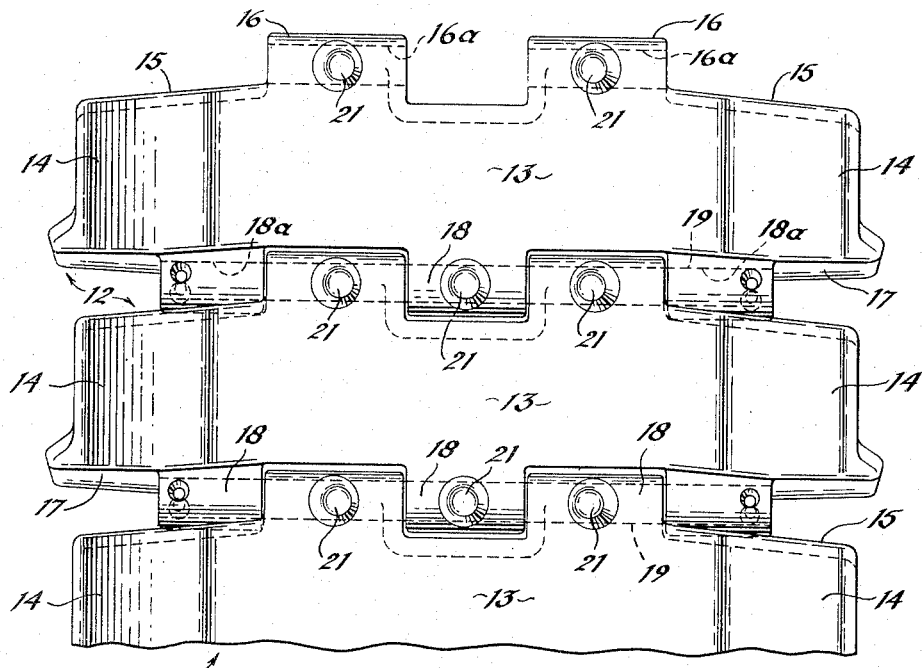

Off-the-highway vehicles use large pneumatic tires both for the purpose of carrying the load and for the purpose of floating the load on a large supporting area which is especially necessary where ground conditions are poor for supporting loads, such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire, so as to give a protective effect to the pneumatic tire, and at the same time to increase the tractive effect when such tires are driven in order to propel the vehicle. It is important that an endless track of this type be firmly engaged with the tire at all times so that the tire does not slip within the track and so wear away the rubber.

The tire illustrated herein is an 18.00 x 25 tire which means that its overall diameter is approximately five feet. My invention is intended for successful operation with such a tire utilizing internal pressures of from 25 to 35 pounds per square inch, or sometimes less.

The tire 10 illustrated herein is of this character. It will be understood that such tires usually have inner tubes but for clarity the inner tube has been omitted from Figs. 1 and 2.

While the combination herein described may be used with a tire having lugs or grooves in its tread surface, it is effectively used with a tread having a smooth surface and the invention will be so described.

The track 11 is composed of a plurality of rigid shoes, preferably of steel or iron, and having articulating or hinged connections between adjacent shoes. One of these shoes is more clearly seen in Figs. 3, 4 and 5. It will be noted that each shoe 12 is longer crosswise of the tire than its extent circumferentially of the tire. Each shoe has a generally flat tread-engaging inner surface 13 which is substantially flat over the major portion of its surface for the full width of the tread of the tire. At each end, this innermost surface toward the tire diverges outwardly and radially inwardly when the shoe is assembled on the tire. These diverging wing portions are designated 14. It will be clear from an examination of Figs. 3, 4 and 5, that the portions 13 and 14 are of metal of comparatively uniform thickness, and of such a thickness to give sufficient strength to the shoe but without being very heavy. This same thickness of metal is bent downward at one side as indicated at 15 to form one leg of a generally U-shaped shoe, when cut in section circumferentially of the tire. From this wall 15 there extend two hinge lugs 16 having through openings 16a to receive hinge pins. On the other side of the shoe, a wall 17 extends downwardly in Fig. 5 from the portions 13 and 14, to form another and longer leg of the U-shaped shoe section. This wall 17 is approximately the same thickness as the walls 13, 14 and 15. From the wall 17 the hinge lugs 18 extend in a direction opposite the hinge lugs 16. These lugs also have through openings 18a to receive hinge pins. The lugs 16 and 18 are so spaced that the lugs 16 fit snugly between the lugs 18 when the track is assembled and as viewed in Fig. 4. Hinge pins 19 are then passed through the lugs 16 and 18 and held in position by any suitable securing means.

The wall 17 of each shoe extends radially beyond the hinge lugs 18 to provide a grouser 20 adapted to bite into the ground to aid the tractive effect. This grouser is preferably deeper at the center of the shoe and shallower at the edges of the shoe.

Upstanding lugs or points 21 are provided on the tire-engaging face of each shoe in position to embed themselves in the tread of the tire when the track is assembled about the tire. These lugs or points may take a various form, but the preferred form in the present invention is to provide generally pointed projections of small area so that they easily embed themselves in the tire tread. The preferred form shown in the drawings are conical shape points having their apexes sufficiently blunt that they will not damage the tire tread.

Figure 5:
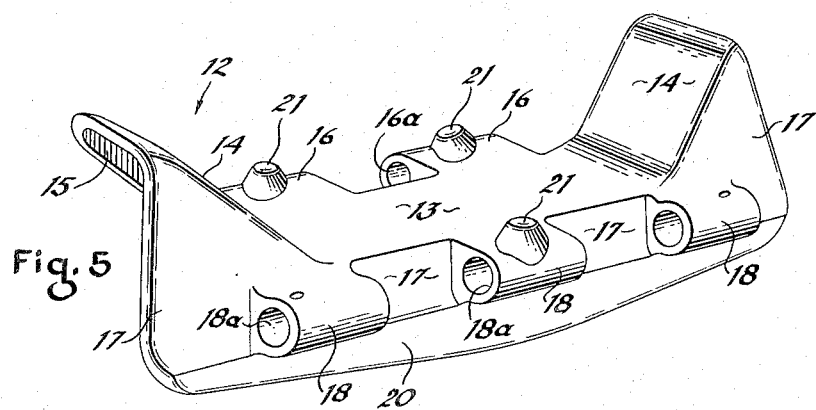
Fig. 5 is a perspective view of a single shoe forming my improved track.

While the points 21 might rise anywhere on the surface 13 of each shoe, a preferred location is to provide these points just over the hinge pin bosses. As clearly shown in Fig. 5, a point 21 is shown on each of the bosses 16, and another point 21 is provided on the central boss 18. When the shoes are assembled in the track, as shown in Fig. 4, the three points 21, two of one shoe, and one of the adjacent shoe, provide a row of three points approximately in line and extending crosswise of the tread of the tire. These sets of three points then occur in parallel lines extending crosswise of the tread and spaced around the tire at the same spacing as the hingepins 19.

In operation, the track 11 is assembled on the tire 10, preferably with the tire in a partially deflated condition. The preferred arrangement is such that the points 21 are partially embedded in the tread of the tire when the latter is under not more than a light load.

The tire 10 is of such a construction and has such a normal working pressure that the ground-engaging portion of the tire flattens under load as indicated in Figs. 1 and 2. It is well known that the outer periphery of the tread of the tire becomes slightly less when the tire is thus flattened on the ground under load. Without my invention, this would cause a loosening of the track 11 upon the tire 10. At the ground-engaging portion of the tire, when flattened under load, the points 21 embed themselves in the tire tread to substantially their full depth as seen in Figs. 1 and 2. The rest of the tread at this point flattens itself against the portions 13 and 14 of each shoe. Some of the air from the ground-engaging portion of the tire is forced around to the non-ground-engaging portions of the tire. This causes the tire at these other zones to resume its normal rounded contour as seen at the top of Fig. 2, so that the tread of the tire becomes convex outwardly when viewed in section. The points 21, at these non-ground-engaging portions of the tire, then exert a follow-up effect and whereas the smooth portions 13 and 14 of the shoes may be out of engagement with the tire tread, as shown at the top of Fig. 2, the points 21 still maintain a firm contact with the tire so that the track does not slip about the tire.

The tire and track assembly herein disclosed is very effective for the purposes intended. The articulated track does not interfere with the action of the large tire in floating the weight upon a large area of the ground contacted. At the same time, the metal track provides great protection against wear and abrasion of the tire. The points 21 embedded in the ground-engaging portion of the tire firmly lock the track and tire together. The grousers 20 firmly embed themselves in the ground and thus the tire and track assembly is geared into the ground itself. This provides a very good driving effect between the wheel 22 and the ground traveled upon.

What I claim is:

1. A shoe for use in an endless tire track, said shoe being wider crosswise of the tire than its length around the circumference of the tire, hollow hinge pin bosses along the longer sides of said shoe, and conical shaped points upstanding from said bosses on the tire engageable side of said shoe, said points positioned approximately in rows extending crosswise of the tire tread.

2. In combination, a pneumatic tire, an endless track completely surrounding and engaging the circumference of said tire, said track comprising a plurality of shoes and articulating connections between adjacent shoes, each of said shoes being wider crosswise of the tire than its length around the circumference of the tire, and being provided with hollow hinge pin bosses along the longer sides thereof constituting said articulating connections, and points upstanding from said bosses and embedded at least partially in the tread portion of said tire, said points positioned approximately in rows extending crosswise of the tire tread and spaced around the tire at the same spacing as said connections.

References Cited in the file of this patent
UNITED STATES PATENTS

| | | |
|---|---|---|
| 1,038,235 | Toso | Sept. 10, 1912 |
| 1,307,036 | Bretscher | June 17, 1919 |
| 2,046,299 | Armington | June 30, 1936 |